United States Patent [19]

Kapura

[11] 4,152,135
[45] May 1, 1979

[54] DEVICE FOR POSITIONING A GLASS EDGE GUIDE IN A GLASS FORMING CHAMBER

[75] Inventor: Edward M. Kapura, Carlisle, Pa.

[73] Assignee: PPG Industries, Inc., Pittsburgh, Pa.

[21] Appl. No.: 888,060

[22] Filed: Mar. 20, 1978

[51] Int. Cl.$^2$ ............................................. C03B 18/02
[52] U.S. Cl. ................................. 65/182 R; 65/99 A
[58] Field of Search ............................ 65/99 A, 182 R

[56] References Cited

U.S. PATENT DOCUMENTS

| | | | |
|---|---|---|---|
| 3,653,868 | 4/1972 | Swillinger | 65/99 A X |
| 3,653,869 | 4/1972 | Biagini | 65/182 R |
| 3,664,820 | 5/1972 | Montgomery | 65/99 A |
| 3,805,072 | 4/1974 | Goerens et al. | 65/99 A X |
| 3,929,444 | 12/1975 | May et al. | 65/182 R |
| 4,008,062 | 2/1977 | Nishikori et al. | 65/99 A X |
| 4,046,549 | 9/1977 | Miller et al. | 65/182 R |

*Primary Examiner*—Arthur D. Kellogg
*Attorney, Agent, or Firm*—Paul A. Leipold; E. Kears Pollock

[57] ABSTRACT

A glass forming chamber for forming flat glass by a float method is provided with glass edge guide devices which extend through walls of the chamber and are externally supported. For each glass edge there is provided a device for positioning the glass edge guide to a desired position relative to the glass within the forming chamber and the walls of the forming chamber. The positioner comprises a drive support located adjacent the chamber with a drive device mounted on the support and a drive follower engaging a portion of the glass edge guide and engaging the drive to provide for positioning the glass edge guide responsive to the action of the drive.

4 Claims, 5 Drawing Figures

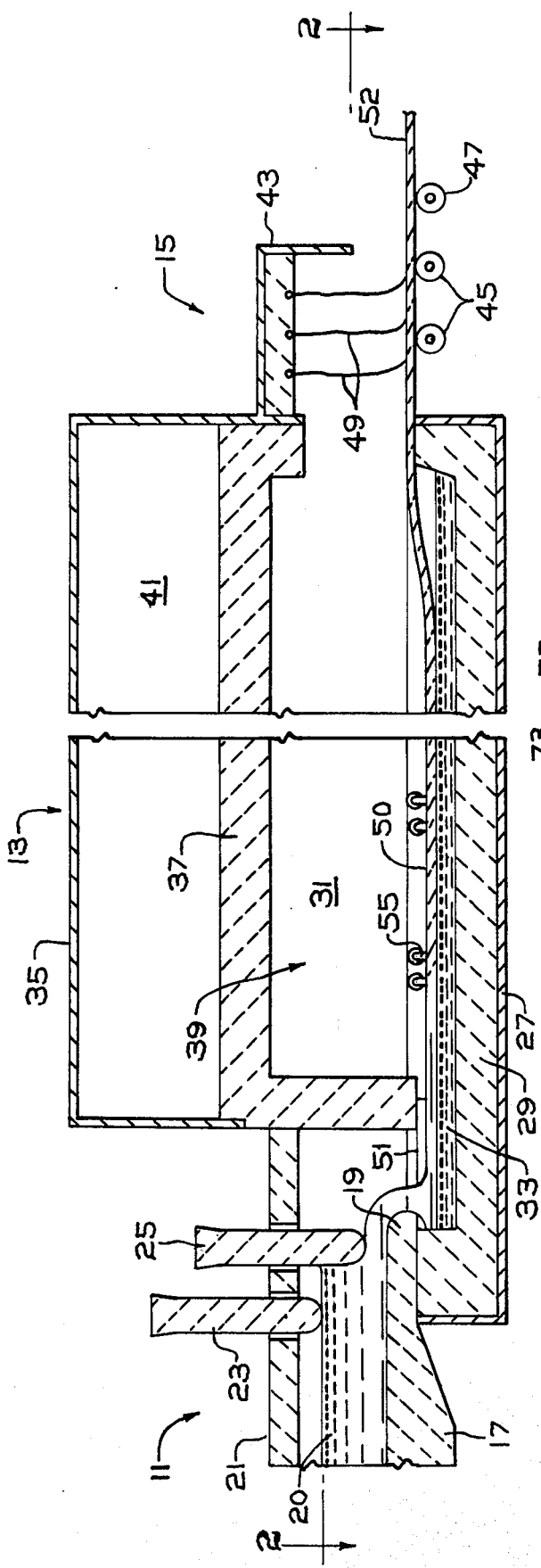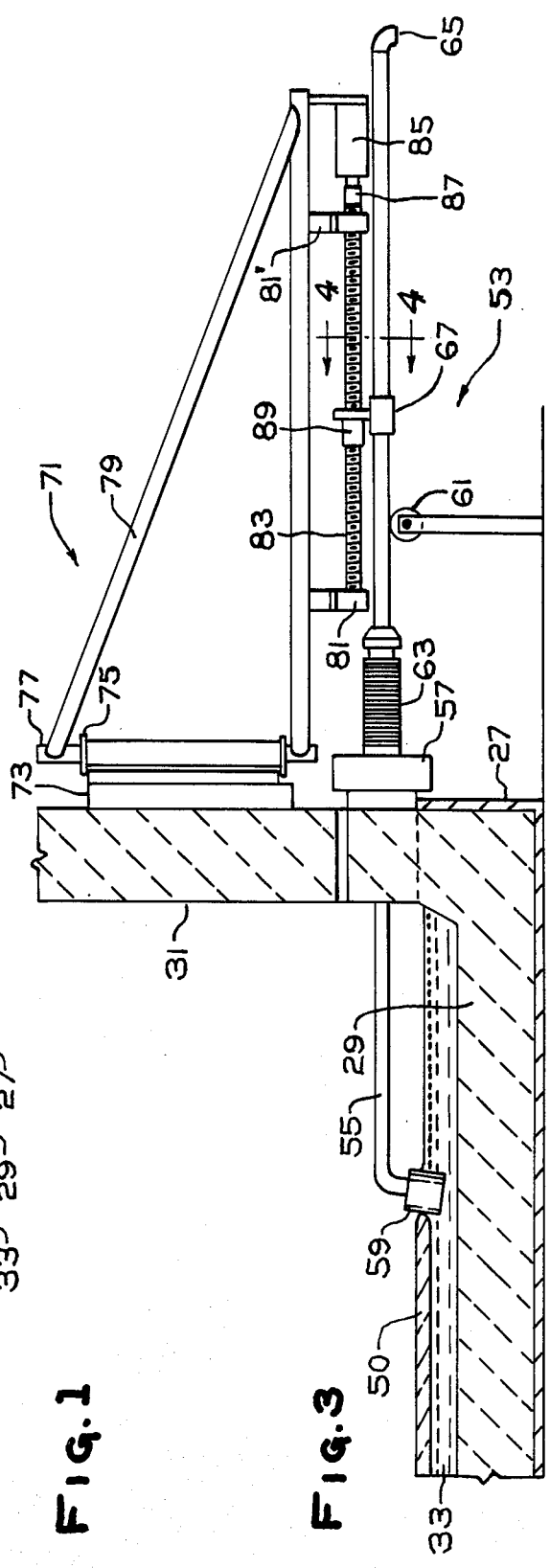

DEVICE FOR POSITIONING A GLASS EDGE GUIDE IN A GLASS FORMING CHAMBER

BACKGROUND OF THE INVENTION

1. Field of the Invention:

The present invention relates to apparatus for manufacturing flat glass wherein the glass is formed while being supported on a surface of a pool of molten metal. More particularly, this invention relates to an apparatus for moving a glass edge guide device extending through a wall of the forming chamber in order to place it in desired positions for controlling the glassmaking process.

2. Description of the Prior Art:

Flat glass may be produced by delivering molten glass into an enclosed chamber containing a pool of molten metal and floating the glass on the molten metal while advancing it along the metal surface and cooling it to form a continuous sheet or ribbon of flat glass as illustrated in U.S. Pat. No. 710,357 to Heal, U.S. Pat. No. 789,911 to Hitchcock, U.S. Pat. No. 3,083,551 to Pilkington and U.S. Pat. No. 3,843,346 to Edge and Kunkle. It is known that devices may be employed inside flat glass forming chambers as shown in these representative patents to guide or position a layer, body or ribbon of glass floating upon and advancing along the surface of molten metal during and following formation into a stable sheet or ribbon of flat glass. As illustrated in U.S. Pat. Nos. 3,223,503 and 3,223,509 to barradell-Smith and Silverwood, devices known as water fences may be employed as glass edge guides. Such devices are thought to provide guiding forces to an advancing layer of glass by inducing desired flows in the supporting pool or bath of molten metal by controlled localized cooling thereof. U.S. Pat. Nos. 3,432,284 and 3,432,285 to Gulotta and U.S. Pat. Nos. 3,843,346 to Edge and Kunkle disclose the use of devices known as guides or restrictors for physically engaging the edges of an advancing layer of glass and restricting or hindering its outward flow from a desired location. U.S. Pat. No. 3,266,880 to Pilkington illustrates devices which, with limited modifications, are known as fenders. Fenders, like restrictors, are designed to prevent the outward flow of glass and restrain the outward movement of the edges of an advancing layer of glass during its formation. Fenders are particularly characterized as being made of material which is not readily wet by molten glass and are used primarily during the manufacture of glass having a thickness greater than that attained when glass is allowed to flow freely outwardly on molten metal until it reaches an equilibrium with the molten metal.

U.S. Pat. No. 3,653,868 to Swillinger illustrates a support for water fence apparatus intended to permit the movement of such a water fence laterally or longitudinally or vertically with respect to the glass forming chamber with which it is associated. U.S. Pat. No. 4,013,438 to Gladieux and Miller illustrates support devices for restrictors and fenders to permit the ready adjustment of the positions of such glass guide devices.

In order to permit the operators of a large flat glass forming facility such as used commercially for the manufacture of flat glass to readily adjust conditions in order to make a variety of desired products, it has become necessary to seek improvements in the equipment and devices employed for guiding glass as it advances through such large commercial forming chambers. In particular, it has been desired to provide means for adjusting and controlling the position of glass guide devices such as those already described.

SUMMARY OF THE INVENTION

According to the present invention, there is provided the improvement of means for positioning glass guide devices which comprises a drive support with a drive mounted on it and with a drive follower engaging the drive and a portion of a glass guide device to be controlled. The positioner is located outside a glass forming chamber and the portion of a glass guide device which is engaged by it is a leg or portion which extends outwardly through a side wall of a forming chamber. The combination is designed to provide for movement of the glass guide device to a desired position responsive to the action of the drive. The drive may be manually or automatically controlled.

The drive may be controlled at the location of the drive and the glass guide device adjacent a side wall of a forming chamber or remote control thereof may be provided. In a large commercial facility which is provided with one or more television cameras having a view of the interior of the forming chamber and connected to television monitors located in a control room, remote operation of the drive is possible and is particularly desirable. An operator may observe the location of the edges of an advancing layer or body of glass inside the forming chamber and adjust the position of glass edge devices along the path of glass advance, initiating movement of the drive in either desired direction. The operator may drive a fence inwardly from the side wall of the forming chamber on one side to move an advancing layer of glass to a desired location (for example, to center an advancing layer of glass so that the finished sheet of glass is centered in a subsequent annealing lehr extending downstream from the forming chamber) or may move glass guide devices inwardly from opposite sides of the forming chamber to force the development of a narrower sheet of glass (for example, moving glass restrictors or fenders located in a region of a forming chamber where glass is readily flowable toward each other).

The drive of the applicant's device may comprise a threaded shaft, a ratchet, a toothed wheel or any other mechanical equivalent connected to a motor or other motive means. The follower may be fixed to the drive in the event that it engages the glass guide device in a manner which permits relative movement with respect to the glass guide device. However, in a preferred embodiment disclosed herein, the follower may be fixed to the drive in the event that it engages the glass guide device in a manner which permits relative movement with respect to the glass guide device. However, in a preferred embodiment disclosed herein, the follower engages the drive in a manner which permits relative movement between the follower and the drive. According to one particularly preferred embodiment, the drive comprises a threaded shaft and the drive follower comprises a body with a threaded core surrounding a threaded drive shaft. The preferred follower engages the glass guide device in a manner which permits little motion betwen the two when operatively engaged. The manner of engagement is described as being fixed for convenience although, as will be seen below, the fixed engagement generally does permit some slight relative movement between the two.

In accordance with a preferred embodiment, the drive and its support are mounted in a manner which permits ready disengagement of the drive, drive support and follower assembly from the glass guide device. In accordance with the particularly preferred embodiment of the applicant's apparatus described herein, the drive support is rotatably mounted to permit rotation about a vertical axis. This arrangement permits adjustment of the assembly for positioning the glass guide device. Rotation of the assembly and glass guide device about a vertical axis extends the range of movement of the guide device throughout a region extending longitudinally within the forming chamber along the path of glass advance through the chamber for a distance equal to the arc of such rotation.

Other objects and advantages of the invention will become apparent from the following description when taken together with the accompanying drawings.

BRIEF DESCRIPTION OF THE DRAWINGS

The accompanying drawings illustrate applicant's device for positioning glass edge guides. In the drawings like numerals are employed to designate like parts throughout.

FIG. 1 is a sectional view of a longitudinal elevation of a glassmaking facility according to this invention;

FIG. 3 is a partial sectional view of a lateral or transverse elevation of the glassmaking facility shown in FIGS. 1 and 2 taken along section line 3—3 of FIG. 2;

DESCRIPTION OF THE PREFERRED EMBODIMENTS

Figure 2:
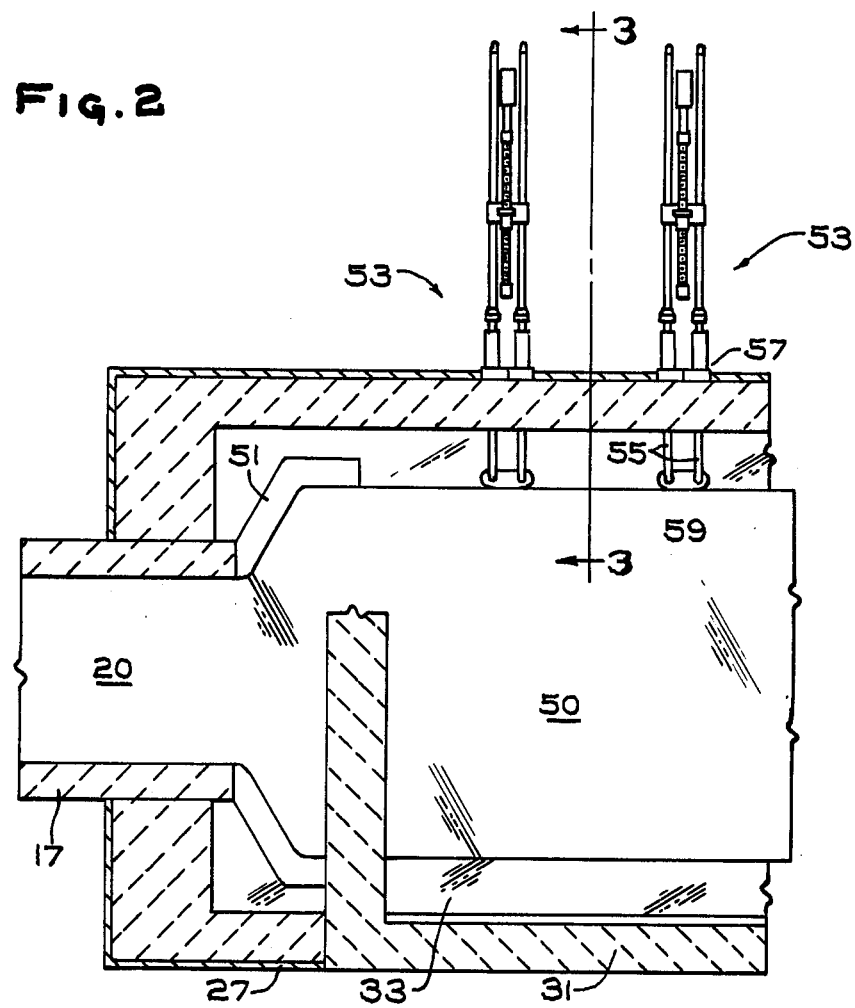
FIG. 2 is a partial sectional view of a longitudinal plan of the glassmaking facility shown in FIG. 1 taken along section line 2—2 of FIG. 1.
Figure 4:
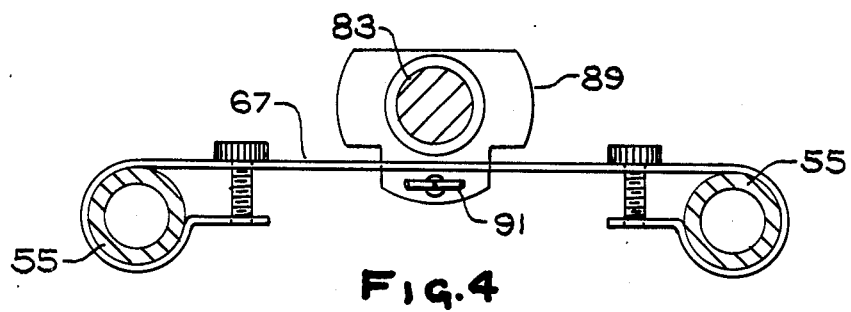
FIG. 4 is a detailed sectional elevation illustrating the means of engagement between the follower of the present glass edge guide positioning device and a glass edge guide.
Figure 5:
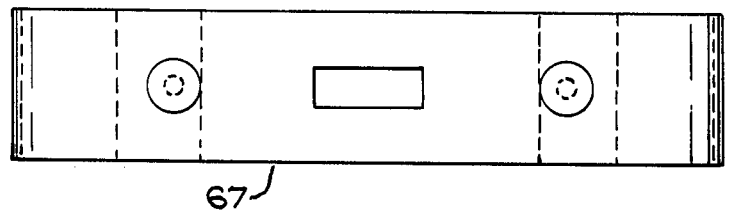
FIG. 5 is a detailed plan showing the same portion of the device as illustrated in FIG. 4.

Referring now to the drawings, there is shown a glassmaking apparatus comprising a molten glass delivery facility 11, such as a canal, connected to a forming chamber or bath 13, which is in turn connected to a glass removal facility 15. In combination, these facilities provide an apparatus for receiving molten glass, forming from that glass a continuous sheet or ribbon of flat glass and conveying that continuous sheet or ribbon of flat glass to an annealing lehr or other subsequent processing facilities.

The glass delivery facility 11 comprises a canal bottom 17 comprising a refractory channel. The bottom of the refractory channel terminates in a lip 19 which extends into the forming chamber 13. A stream of molten glass 20 is supported upon and flows along the refractory channel characterized as the canal bottom 17. Extending over the canal bottom is a roof or flat arch 21. Transverse openings extending across the canal are provided in the roof 21. Two metering members are supported above the canal and extend downwardly through these openings. One of these, a backup tweel 23, is generally maintained in an elevated position to permit the free flow of the stream of molten glass 20 beneath it and into contact with an operating tweel 25. The operating tweel 25 is adjusted to a vertical position providing for an opening of desired size, defined by the operating tweel 25 and the canal bottom 17, to control the rate of delivery of molten glass into the forming chamber 13.

The forming chamber 13 comprises a bottom casing 27 in which there is disposed a bottom liner 29 made of refractory materials. Interior side walls 31 extend upwardly along the sides of the forming chamber. A pool or bath of molten metal 33 (preferably tin or an alloy of tin) is maintained within the bottom liner 29 between the side walls 31. An upper casing 35 encloses the chamber. Extending transversely across and longitudinally along the length of the forming chamber is a roof structure 37 which separates the inside of the chamber into a headspace between the roof 37 and the pool of molten metal 33 and a plenum or service space 41 above the roof and within the upper part of the upper casing 35.

The glass removal facility 15 includes an exit canopy 43 extending from an end wall of the upper casing 33. Lift-out rolls 45 are provided for lifting a continuous sheet of flat glass from the pool of molten metal 33 and conveying it from the chamber 13. The lift-out rolls 45 lead to a continuous conveyor beginning with conveyor roll 47 which is typically located in an annealing lehr. Curtains or other equivalent seals 49 are provided in a space between the end of the forming chamber 13 and the annealing conveyor. Such curtains 49 are mounted in the exit canopy 43 and extend downwardly into close proximity or contact with a continuous sheet of glass being withdrawn from the chamber.

During operation a stream of molten glass 20 flows over the lip 19 and falls onto the upper surface of the pool of molten metal 33 forming a layer 50 of molten glass thereon. In a preferred embodiment the layer of molten glass is formed between guides or restrictors 51 which control the width of the advancing layer of glass 50 on the surface of the pool of molten metal 33. As the layer of glass 50 is advanced along the surface of the pool of molten metal 33, it is cooled and forces are applied to it to cause it to assume a desired thickness. When the advancing glass 50 has reached a condition of substantial dimensional stability (that is, due to the decreased temperature and increased viscosity of the glass, its width and thickness do not tend to substantially change despite the forces imposed thereto), the glass is characterized as a continuous sheet or ribbon 52 of glass which is lifted from the pool of molten metal 33 by the action of the lift-out rolls 45 and conveyed from the chamber.

Along one or both sides of the forming chamber, there may be located a fence assembly 53 which is one embodiment of a glass guide device. The fence assembly 53 includes a pair of spaced fence legs 55 which are joined together by a section bent in a manner of a hairpin. The fence legs 55 extend through a side wall 31 of the forming chamber through a side seal 57. A boat or fender 59, preferably made of a material which is not wet by a molten glass, is mounted on the inner bent portion of the fence legs. The outer portions of the fence legs are supported on a roller 61 mounted on a plumber's stand. The fence legs 55 are surrounded by flexible seals 63 mounted in the side seal 57. At the ends of the fence legs 55 there are provided couplings 65 for the attachment of flexible hoses or other conduits for providing a coolant, such as water, to the fence 53 and for draining spent coolant from the fence. A fence clamp 67 is fixed to the fence legs 55 and extends between them.

The glass guide device (fence 53) is provided with a positioning assembly 71 which comprises a support 73 fixed to a side portion of the upper casing 35 of the apparatus. The support 73 is provided with a mounting 75 which is engaged by a rotatable shaft 77 to which there is mounted a support bracket 79. Mounted on the bracket 79 and depending from it are pillow blocks 81 and 81'. Rotatably mounted in the pillow blocks 81 and 81' is a threaded shaft 83 connected to a motor 85 through a universal joint 87. A friction clutch or transmission may be included in the drive assembly in place of or in addition to the illustrated universal joint 87. The motor 85 is provided with a connection with a source of power (not shown) which may be provided with switch or more sophisicated control means such as a variable resistance control device (not shown). In any event, the motor 85 is provided with means for operating it in either direction to rotate the drive shaft 83 in either direction. Engaged to the drive shaft 83 is a follower 89 comprising a block having a threaded core. As the drive shaft 83 is rotated, the follower 89 is caused to move along the axis of the drive shaft 83 in a direction along the drive shaft 83 either closer to the side wall 31 of the forming chamber 13 or farther from it depending upon the rotation of the drive shaft 83. The follower 89 includes a lug or a pin extending downwardly for engaging the fence clamp 67. The follower 89 engages the fence clamp 67 by being inserted into a slot or opening on the fence clamp 67. A cotter pin or key 91 may be inserted into the lug of the follower 89 to prevent it from rotating with the drive shaft 83 and inadvertently disengaging the clamp 67. The follower 89 may be readily disengaged from the fence clamp 67 by moving the outer portions of the fence legs 55 downwardly and by rotating the positioning assembly bracket 79 with the attendant drive away from alignment with the fence assembly 53.

As may be readily appreciated by those skilled in the art, the glass guide device to which the present positioning assembly improvement is applicable includes not only the fences as illustrated but also glass-wetted or non-wetted guides or restrictors as known in the art. It may be used with non-wetted glass fenders as known in the art. It also may be used with devices for bumping or physically engaging a confined portion of a relatively cool and dimensionally stable glass sheet in a forming chamber such as freely rotatable refractory bumpers mounted on cooled or uncooled legs extending through a side wall of a chamber. Those skilled in the art will recognize that applicant's invention is not limited to the particular embodiments illustrated and described herein and will realize with the benefit of this disclosure that variations and modifications of this invention falling within the scope and spirit of the appended claims may be devised as contemplated by the applicant.

I claim:

1. In an apparatus for forming flat glass including a chamber containing a pool of molten metal upon which glass is supported, advanced and cooled to form a continuous sheet of flat glass, said chamber including a bottom, side walls, a roof structure, an inlet end and an outlet end, wherein means for guiding advancing glass along its path of advance is provided between a side wall of said chamber and a marginal edge of advancing glass, which glass guide means includes at least one leg extending through a side wall of said chamber and supported by a support outside said chamber in a manner permitting movement of said glass guide means relative to said side wall to effectively guide advancing glass and control the location of its marginal edge relative to the location of said side wall, the improvement of means for positioning said glass guide means which comprises:

a side wall opening of said chamber permitting angular and lateral movement of said glass guide means;

a drive support movably mounted on upper support means adjacent said chamber;

a drive means mounted on said drive support;

a drive follower mounted on said drive means for movement relative to said side wall;

a traversing element fixed to said glass guide means;

lower support means located between said side wall and said traversing element in slideable contact with said glass guide means;

quick detachable means engaging said drive follower and said traversing element whereby to facilitate rapid adjustment of said glass guide means after releasing said quick detachable means.

2. The apparatus according to claim 1 wherein said drive follower engages said at least one leg of said glass guide means by being fixedly connected thereto and movably engages said drive means.

3. The apparatus according to claim 2 wherein said drive means includes a threaded shaft and said drive follower has a threaded core engaging said threaded shaft for providing movement of said follower and said glass guide means which is connected to it in response to rotation of said threaded shaft.

4. The apparatus according to claim 3 wherein said drive means further includes a motor for rotating said threaded shaft.

* * * * *